United States Patent [19]

Alburger

[11] 3,926,044

[45] Dec. 16, 1975

[54] CLOSED-LOOP WATER-WASHABLE INSPECTION PENETRANT PROCESS

[76] Inventor: James R. Alburger, 5007 Hillard Ave., La Canada, Calif. 91011

[22] Filed: Jan. 11, 1974

[21] Appl. No.: 432,752

[52] U.S. Cl.................................. 73/104; 23/230 R
[51] Int. Cl.².......................................... G01N 21/16
[58] Field of Search......... 73/104; 23/230 R, 230 C, 23/230 L, 253 R; 134/10

[56] References Cited
UNITED STATES PATENTS

| | | | |
|---|---|---|---|
| 2,871,697 | 2/1959 | Sockman | 73/104 |
| 2,953,530 | 9/1960 | Switzer | 73/104 UX |
| 3,528,284 | 9/1970 | Skoglund et al. | 73/104 |
| 3,764,265 | 10/1973 | Mlot-Fijalkowski | 73/104 X |

*Primary Examiner*—Richard C. Queisser
*Assistant Examiner*—John P. Beauchamp

[57] ABSTRACT

A closed-loop water-washable inspection penetrant process in which both the penetrant and the wash water are recovered for re-use. A non-surfactant-type low-solubility penetrant which has been applied to test parts is wash-removed, leaving penetrant entrapments in crack defects. The thus-removed penetrant is separated from the wash water partly by skimming off undissolved penetrant, and partly by solvent extraction of dissolved penetrant into a halocarbon solvent. The penetrant-containing halocarbon solvent is distilled to recover both solvent and dissolved penetrant.

2 Claims, 1 Drawing Figure

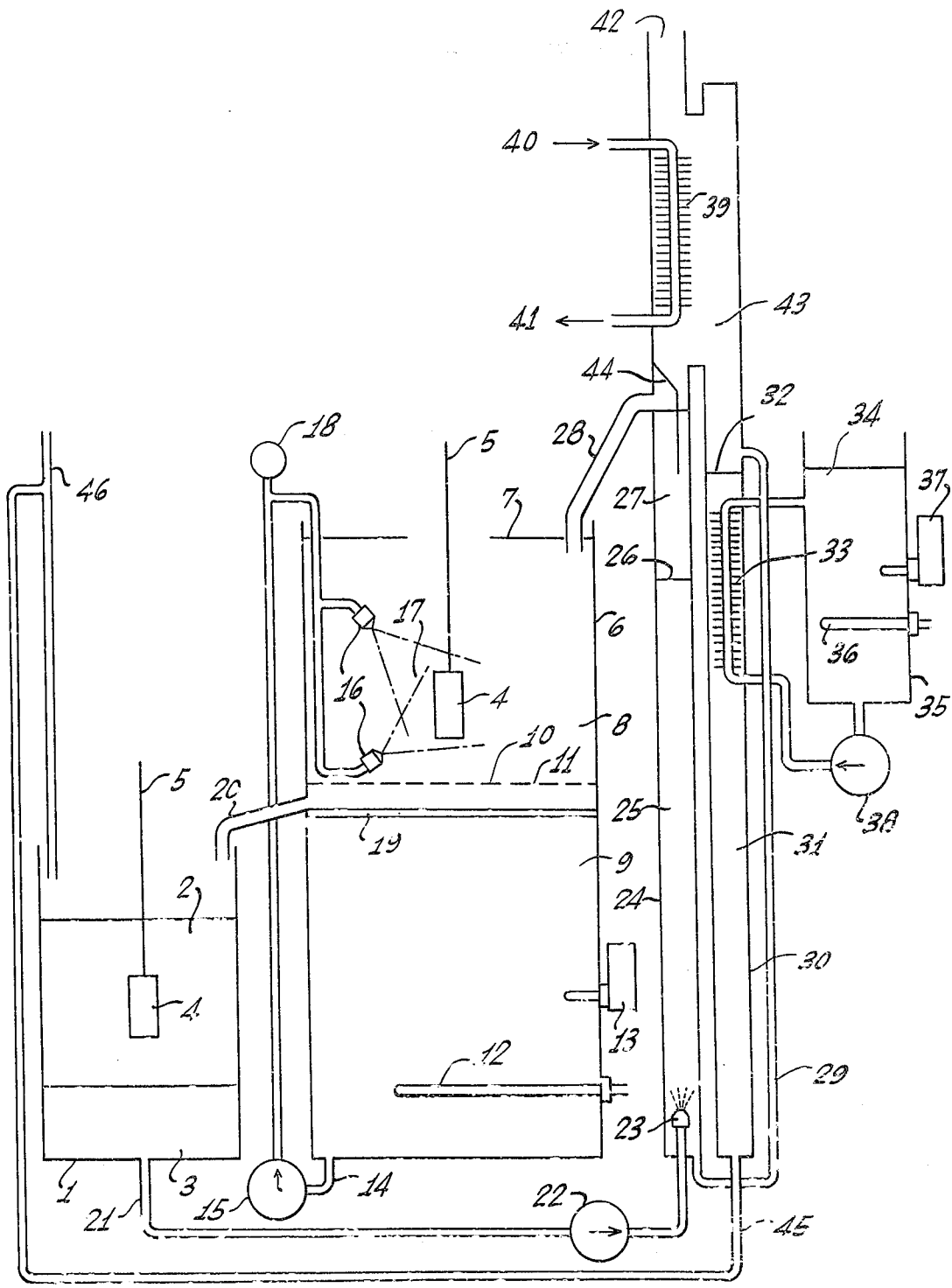

CLOSED-LOOP WATER-WASHABLE INSPECTION PENETRANT PROCESS

RELATED PATENT APPLICATIONS

Appln. Ser. No. 327,306 - Filed Jan. 29, 1973, now abandoned, for "ENHANCED STABILITY WATER-WASHABLE PENETRANT COMPOSITION AND PROCESS THEREFOR".

Appln. Ser. No. 513,084 - Filed Oct. 8, 1974, for "WATER-WASHABLE INSPECTION PENETRANT EMPLOYING MINERAL SOLVENT AND A FATTY ACID SOLUBILITY PROMOTER".

This invention relates to water-washable inspection penetrants and processes therefor. More particularly, the invention relates to apparatus and methods for recovery and re-use of both the penetrant and the wash water which are utilized in the inspection penetrant process.

In the past, it has been the practice to employ so-called "water-soluble" or "self-emulsifiable" compositions for use in the water-washable inspection penetrant process. The most commonly used water-washable penetrants are those of the "oil-phase" type, which comprise essentially an oily liquid containing a solution of indicator dye and sufficient detergent to render the oily liquid emulsifiable in water. Other types of penetrant compositions have been utilized in the past, for example water-soluble dyed liquids such as glycols or mixtures of glycols and water-soluble surfactants.

In any event, water-washable penetrants as employed in the past have all been characterized by an ability to dissolve in wash water or become emulsified upon contact with wash water. Test parts which are being inspected for the presence of surface crack defects are dipped in the water-washable penetrant and allowed to drain. They are then washed with water to remove surface penetrant, leaving entrapments of penetrant in any cracks which may be present. The entrapments of penetrant are revealed by the dissolved indicator dye, visible-color or fluorescent, as the case may be.

An alternative form of penetrant composition and usage is the so-called Post-Emulsifier Process, in which an oily water-insoluble dyed liquid penetrant is applied to test parts, following which a separate emulsifier is applied so as to render the oily penetrant emulsifiable in wash water. Emulsifiers for such usage are chemically equivalent to water-washable penetrants, except that they do not contain indicator dyes.

Water-washable penetrants (and comparable emulsifiers) are all characterized by the formation of relatively stable solutions or emulsions, and the dissolved or emulsified penetrant cannot be readily extracted or separated from the wash water. As a result, wash water which is employed for either the water-washable penetrant process or the Post-Emulsifier process contains considerable contaminants of emulsified or dissolved penetrant, and such contaminants have become an increasingly objectionable source of pollution in sewage systems or water disposal systems. In some cases, municipalities have legislated against disposal of any effluents containing contaminants of penetrants or emulsifiers.

Attempts have been made in the past to recover and re-use penetrant materials, and such attempts have been partially successful insofar as it has been found possible to recover a portion of the insoluble oily penetrant as used in the Post-Emulsifier process. Some penetrant may be stripped off of test surfaces by a pre-rinse under a high-pressure water spray, the thus-removed penetrant being collected by flotation and separation by skimming or re-capture over a drainage weir. However, Post-Emulsifier-type penetrant which is emulsified, the emulsifier itself, and of course water-washable penetrants, cannot be conveniently separated from the wash water.

Certain water purification methods have been devised, for example filtration systems utilizing activated carbon or other flocculating agents which serve to precipitate emulsified materials onto a solid clarifier. Methods of this kind have not proved to be entirely satisfactory, since there still exists the problem of disposal or re-cycling of the clarifier.

I have discovered that it is possible, through the use of certain types of water-washable penetrants, and through certain procedures of recovery, which will be described hereinafter, to separate used penetrant from the wash water and to re-use both of these process materials. Thus, I have found it possible to employ certain types of water-washable penetrants in a closed-loop system in such a way that the only loss of process materials, penetrant or water, is by virtue of a small amount of water evaporation or the minute amount of penetrant which is carried out in the form of entrapments in crack defects in test parts.

The principal object of the invention, therefore, is to provide a water-washable inspection penetrant process in which both the penetrant and the wash water may be recovered and re-used.

This and other objects of the invention will in part be obvious, and will in part become apparent from the following specification when read in conjunction with the drawing which is a diagram, in cross-section, showing a typical arrangement of apparatus as utilized in the process of the invention.

I have discovered that certain types of low-solubility water-washable penetrants, which I have devised, and which contain no detergent, are adaptable to a process of solvent extraction, whereby the small amount of penetrant which dissolves in the wash water may be efficiently separated from the water, leaving water which is sufficiently pure to be re-used in the washing step of the penetrant process. Penetrants which are suitable for use in the process of the invention are those which are characterized by a finite but relatively small solubility, and essentially no emulsifiability. At least two categories of these non-surfactant-type, low-solubility penetrants have been disclosed and claimed in my copending Applns., Ser. No. 327,306, filed Jan. 29, 1973, now abandoned, for "Enhanced Stability Water-Washable Penetrant Composition and Process Therefor", and Ser. No. 513,084, filed Oct. 8, 1974, for "Water-Washable Inspection Penetrant Employing Mineral Solvent and A fatty Acid Solubility Promoter".

I have found that any oil-compatible penetrant which is slightly soluble in water, but which is essentially "non-surfactant" in character, will function properly in the closed-loop process of the invention. By "slightly soluble", it is meant that the penetrant is soluble in water to an extent which is less than a few percent concentration. I have found numerous suitable low-solubility penetrant compositions, some of which exhibit solubilities in water which are somewhat less than .01%. Examples of suitable penetrant compositions have been disclosed and claimed in my aforesaid copending Applns., Ser. Nos. 327,306 and 513,084, now abandoned.

In addition to a non-surfactant-type water-washable penetrant and water, I employ one other process material in the process of the invention, this being a volatile water-insoluble solvent which is compatible with and a solvent for the penetrant composition. Any one of a large number of halocarbons may be used as this process constituent, as for example any of the normally liquid but volatile chlorinated hydrocarbons or fluorinated hydrocarbons (Freons T.M.). In selecting a volatile solvent for use in the process of the invention, consideration must be given to distillation characteristics and specific gravity of the liquid. Although any one of various halocarbons may be utilized, I have found that perchloroethylene has a highly favorable combination of desirable features, as will be seen from the following description of the process. Certain of the Freons fall in the category of preferred solvents, as for example $CCl_2F$-$CClF_2$ (Freon TF), or $CCl_2F$-$CCl_2F$ (Freon BF).

In essence, the process of the invention involves recovery of used penetrant by means of a three-stage process. Part of the penetrant is stripped off of test parts by means of a strong spray of wash water. Then, some of the penetrant on test surfaces is actually dissolved in the wash water. Thus, the wash water usually has a layer of undissolved penetrant floating on its surface, and a certain amount of penetrant is dissolved or dispersed in the wash water.

In recovering or separating the penetrant from the wash water, the first stage is to skim off any penetrant which floats on the surface of the wash water. This may be accomplished by a simple drainage weir which is adjusted to drain the floating layer of penetrant into the penetrant reservoir. Any water which is carried into the penetrant reservoir sinks to the bottom of the reservoir, and may then be drawn off through a suitable outlet.

The second stage is to pass the used wash water containing dissolved penetrant through a column of the halocarbon extraction solvent. Any penetrant which is present in the wash water is extracted from the wash water, becoming dissolved in the halocarbon solvent.

The third stage is to distill off the volatile halocarbon solvent, leaving the pure penetrant composition which is returned to the penetrant reservoir. The vaporized halocarbon solvent is condensed by means of a cooling coil, and is returned to the extraction column.

The accompanying drawing illustrates a typical setup of apparatus which may be employed in the process of the invention. Referring now to the drawing, there is illustrated here a flow-chart which indicates the various essential steps of the process of the invention. An open-top tank 1 serves as a penetrant reservoir, and contains two layers of liquids; a layer of penetrant 2, and a layer of used wash water 3. Since the penetrants used are always lighter in specific gravity than water, the penetrant floats as a layer above the layer of used wash water.

A test part 4 is immersed in the penetrant layer 2, being supported by a hanger 5. A brief immersion of the test part 4 in the penetrant 2 permits the penetrant to enter into any crack defects which are present, forming entrapments therein.

The test part 4 is then transferred to a wash-tank 6. This tank is an open-top tank having a splash-cover 7, and having two sections, the upper spray-wash section 8 and the lower water-reservoir section 9. These two sections may be separated by a shelf or panel 10, containing drainage holes 11, which permit wash water to drain down into the water reservoir section 9. Alternatively, these two sections 8 and 9 may be constructed as separate tanks.

The water reservoir section 9 is kept substantially filled with water, and the temperature of the water in this reservoir is controlled to a desired point by means of a heater element 12 and a thermostat control 13.

Water is drawn out of the bottom of tank 6 through a pipe outlet 14. A pump 15 forces the wash water through a series of spray nozzles 16, providing a uniform cross-spray of water 17 on the test part 4. Water pressure may be measured by means of a pressure gage 18. Thus, thermostatically controlled water is continuously circulated in the wash tank 6.

Penetrant which is removed from test part 4 is in part dissolved in the wash water, and in part floats on the surface of the water in the reservoir section 9, forming a layer of penetrant 19. This layer of penetrant drains off through pipe 20 and is returned to the penetrant reservoir 1, where it is restored to the penetrant layer 2.

As penetrant is drained through pipe 20, some water is also carried through this pipe back into tank 1. This used water falls to the bottom of the tank 1, forming the used-water layer 3. This used water is drawn off from the bottom of tank 1 through a pipe outlet 21, and is forced by means of a pump 22 through a set of spray nozzles 23 situated at the bottom of a solvent-extraction column 24. This column is filled with a water-insoluble volatile solvent 25, preferably perchloroethylene, Freon TF (T.M.), or Freon BF (T.M.), up to a column height as shown by line 26.

Spray droplets of water from nozzle 23 rise through the column of liquid 25, forming a layer of purified water 27 which floats on top of the column of halocarbon solvent liquid 25. As water is pumped into the solvent-extraction column 24, the layer of purified water 27 overflows through pipe 28 and is returned to the wash-water reservoir tank 6. The halocarbon solvent 25 moves by gravity through pipe 29 from which it discharges into the top of a distillation column 30. This column 30 is filled with penetrant 31 up to a column height 32.

The top portion of the liquid column 31 is heated by means of a heat-exchange coil 33 to a temperature above the boiling point of the halocarbon solvent, or at least to a temperature where the vapor pressure of the halocarbon solvent is sufficient to provide rapid distillation of the solvent. Heat is injected into the liquid column 31 by means of a heat-exchange liquid 34, contained in a tank 35. This heat-exchange liquid is heated by means of a heater element 36, its temperature being controlled by means of a thermostat 37. The heat-exchange fluid 34 is circulated by means of a pump 38.

The volatile halocarbon solvent 25 which passes into the distillation column 30 contacts the hot penetrant at the top of the layer 32, where it boils off. The halocarbon vapors condense on a cooling coil 39 which is cooled by cold water or other suitable coolant which enters the coil at point 40, and exits at point 41. The halocarbon vapors are heavy, and they are easily contained in the arrangement of extraction column 24 and distillation column 30. For example, vapors of perchloroethylene, which is a preferred halocarbon, will not rise more than a few inches in the vent stack 42, as long as the cooling coil 39 is kept at a temperature of about 75° F. or less.

The two columns, solvent extraction 24, and distillation 30, are arranged so that a vapor-transfer window 43 permits passage of vapor from the distillation column 30 to the extraction column 24, where the vapor is condensed on the cooling coil 39, and where the condensate drips down into the solvent layer 25. A baffle 44 may be provided to prevent droplets of condensate from being carried over through pipe 28. The process of distillation in column 30 results in the accumulation of purified penetrant which passes down the column and out through pipe outlet 45 and back through a vent-riser 46, and into the penetrant reservoir tank 1.

The process illustrated in the drawing is shown in an extremely simplified form. In practice, it may be necessary to provide cooling for the water which is pumped into the extraction column 24 through nozzle 23. If this water is too hot, it may raise the temperature of the liquid column 25 to a point where there is interference with the condensation of solvent from coil 39. Also, it may be found necessary to cool the penetrant which is returned to the penetrant reservoir tank 1, through pipe 45. Normally, this is not necessary, since the flow rate of this penetrant return is quite slow.

It is of course apparent that the size and disposition of the various components of apparatus, as used in the process of the invention, may be varied depending on the size of parts to be tested, the desired flow rates for water and solvent circulation, etc. I do not restrict the disclosure to any particular arrangement of elements.

Numerous variations may be made in the setup of process apparatus. For example, the penetrant in reservoir tank 1 may be applied to test parts by means of pressure spray or electrostatic spray, instead of dipping. Test parts may be transferred into and out of the spray-wash tank 6, section 8, by means of an automated conveyor. Large parts might be processed in large open trays or troughs, the penetrant and wash water being applied by spray, the used liquids being transferred back into the water reservoir tank 6, section 9, by means of a pump.

Instead of using a heat-exchange coil 33, it might be preferred to apply heat directly to the upper region of the liquid column 31 by means of an electrical heating element.

In the solvent extraction column 24, it might be desired to insert a series of deflection baffles, or to fill the column with glass beads, so as to increase the length of the path taken by droplets of used wash water as they float up through the solvent column 25, or to increase the area of the water-to-solvent interface, thereby enhancing the efficiency of transfer of dissolved penetrant from the wash water to the halocarbon solvent.

While perchloroethylene is a preferred halocarbon solvent for use in the extraction column 25, any one of several other halocarbon solvents may be utilized. Certain of the chlorine-fluorine halocarbons (Freons) have characteristics which are desirable for such use, however these are somewhat more expensive than perchloroethylene. Certain of the halocarbons are toxic in nature, or tend to decompose over a period of time, and some are flammable. Obviously, suitable precautions should be taken in the event a solvent is used which presents potential hazard conditions.

Table I shows a listing of a number of halocarbon solvents which may be used as extraction solvents in the process of the invention. This table lists the properties of commercially available halocarbon solvents, none of which are flammable.

TABLE I

| CHEMICAL FORMULA | TRADE NAME | Sp. G. | SOLUBILITY (%) In $H_2O$ | $H_2O$ In | B.P.°C | PROPERTIES |
|---|---|---|---|---|---|---|
| $CH_2Cl_2$ | Methylene Chloride | 1.32 | 2 | .17 | 40.4 | Hydrolyzes |
| $CHCl_3$ | Chloroform | 1.41 | .77 | .081 | 61.3 | Oxidizes |
| $ClCH:CCl_2$ | Trichloroethylene | 1.43 | .11 | .02 | 88 | Sl. Toxic |
| $CH_3CCl_3$ | 1.1.1-Trichloroethane | 1.32 | .44 | .05 | 74 | Low Toxicity |
| $CHCl_2CH_2Cl$ | 1.1.2-Trichloroethane | 1.44 | .125 | .08 | 113.5 | Sl. Toxic |
| $CCl_4$ | Carbon Tetrachloride | 1.48 | .08 | .013 | 76.7 | Toxic |
| $CCl_2:CCl_2$ | Perchloroethylene | 1.44 | .015 | .008 | 121 | Low Toxicity |
| $CHCl_2CHCl_2$ | Tetrachloroethane | 1.57 | .29 | .13 | 146 | Ext. Toxic |
| $CCl_2FCCl_2F$ | Freon BF(112) | 1.61 | .013 | .0099 | 93 | Low Toxicity |
| $CCl_2FCClF_2$ | Freon TF(113) | 1.56 | .017 | .0086 | 47.6 | Low Toxicity |
| $CCl_3F$ | Freon MF (11) | 1.47 | .14 | .0086 | 24 | Low Toxicity |
| $CBrF_2CBrF_2$ | Freon 114B2 | — | — | — | 47.5 | — |

As pointed out above, a wide variety of water-washable penetrants may be used in the closed-loop process of the invention, the only restriction being that they shall be non-surfactant-type penetrants having solubility in water less than a few percent. I have found that conventional water-washable penetrants which contain emulsion-forming surfactants or detergents tend to form emulsions which are more-or-less firmly bonded to the water so that the halocarbon solvent does not extract the emulsified penetrant from the water. Hence, conventional water-washable penetrants cannot be utilized in the process of the invention.

Non-surfactant-type penetrants which are soluble in water to concentrations greater than a few percent are not suitable for use in the process of the invention. Such penetrants are not only inefficient from the standpoint of retention of penetrant entrapments in crack defects, but they cause excessive contamination in the wash water so that the solvent extraction stage in the process may become overloaded.

I recognize that all chemical materials exhibit surface-active features, at least to some small degree. In my now-issued U.S. Pat. No. 3,751,970, for "Inspection Penetrant Process and Composition for Aiding Removal of Excess Penetrant from Test Part Surfaces", I have disclosed numerous chemical substances which may exhibit detergency characteristics, either as surfactants or "synergists", even though these substances are not considered to have any surface-active properties, as surface-active materials are normally defined. In any event, for the purpose of the present invention I define a non-surfactant-type penetrant composition as one which does not form an emulsion in water as normally occurs in the presence of conventional detergent materials.

It will be understood that the low-solubility penetrants which may be employed in the closed-loop process of the invention may be dissolved in the wash water to a small degree, or they may become dispersed in the water by mechanical action of the spray-wash operation. I make no distinction between these two modes of mixing the penetrant with the wash water.

The low-solubility penetrants suitable for use in the process of the invention usually have relatively high boiling points. This is not a critical factor, as long as the vapor pressure of the penetrant is relatively insignificant at the boiling temperature of the halocarbon solvent. A suitable penetrant may consist of a dyed mineral solvent or mixture of mineral oils along with a solubility promoter, as disclosed and claimed in my above-mentioned copending Appln. Ser. No. 513,084, or a dyed low-solubility organic solvent liquid such as a higher alcohol, as disclosed and claimed in my above-mentioned copending Appln. Ser. No. 327,306, now abandoned.

It will be understood that the preferred halocarbon solvents for use in the steps of solvent extraction and distillation are 1.1.2.2-Tetrachloroethylene (Perchloroethylene), 1.1.2.2-Tetrachloro-1.2-difluoroethane (Freon BF-112), and 1.1.2-Trichloro-1.2.2-trifluoroethane (Freon TF-113).

Finally, it will be understood that the indicator dye or dyes which may be employed in the low-solubility penetrant compositions used in the process of the invention may be any one of the known oil-soluble or solvent-soluble dyes. The common and well known dye, Oil Red - O, is preferred where a visible-color indicator is wanted. For black light usage, the preferred indicator dye is a combination of 4-methyl-7-diethylaminocoumarin (C.I. Fluorescent Brightening Agent 68) and a yellow color-former dye such as Fluorol 7GA (C.I. Solvent Yellow 43).

During continuous operation of the apparatus as used in the process of the invention, used wash water is continuously circulated through the extraction column containing the halocarbon solvent. A small amount of halocarbon solvent dissolves in the water or may become entrained in the stream of water. In the case of Freon TF ($CCl_2F-CCLF_2$), the dissolved halocarbon amounts to only .017%, which is about 10 ml. of the halocarbon in the entire water reservoir, where the water reservoir is 25 gallons. Normally, this amount of dissolved halocarbon will not significantly alter the solvency characteristics of the wash water with respect to the penetrant constituent of the process, however it will be understood that if there is an excessive degree of entrainment of halocarbon solvent in the stream of wash water, or if operating conditions demand extremely accurate control over depletion of penetrant entrapments during washing, then a compensation in wash-water contact time must be made to correct for any deviations which are introduced as a result of excessive contamination of the wash water by halocarbon solvent. In any event, in a continuous operation of the apparatus, an equillibrium condition will be reached such that the flaw detection performance of the penetrant and wash-remover process will be substantially uniform and constant.

It will be seen from the foregoing specification that I have devised a new and novel process for the utilization and re-use of water-washable penetrant and wash water materials in the inspection penetrant method. Although the invention has been described with reference to particular embodiments thereof, it will be understood that various changes may be made therein without departing from the spirit of the invention or the scope of the appended claims.

I claim:

1. In a water-washable inspection penetrant process in which a water-removable dyed liquid inspection penetrant is applied to a test surface and excess surface penetrant is removed by washing said test surface with water, leaving entrapments of said penetrant in any crack defects which are present, and leaving at least part of said penetrant in the form of a solution in said wash water, the improvement which permits recovery and re-use of both the wash water and penetrant dissolved in said wash water in which said penetrant is a non-surfactant-type low-solubility composition, and in which recovery of said penetrant is effected by the steps of (1) injecting said water solution of penetrant into a normally liquid water-insoluble volatile halocarbon solvent to provide for extracting said penetrant from said water solution, (2) separating said wash water from said volatile halocarbon by flotation, and (3) distilling said volatile halocarbon to separate said extracted penetrant.

2. A process in accordance with claim 1 in which said halocarbon solvent is at least one member selected from the group consisting of:

1.1.2.2-Tetrachloroethylene (Perchloroethylene),
1.1.2.2-Tetrachloro-1.2-difluoroethane, and
1.1.2-Trichloro-1.2.2-trifluoroethane.

* * * * *

Disclaimer 3,927,044.—*Larry R. Foster* and *Hans H. Kuhn*, Spartanburg, S.C. ALKALINE STABLE FUGITIVE TINTS. Patent dated Dec. 16, 1975. Disclaimer filed Nov. 2, 1981, by the assignee, *Milliken Research Corp.*

Hereby enters this disclaimer to the entire remaining term of said patent.
[*Official Gazette Jan. 5, 1982*]